(12) United States Patent
Abe et al.

(10) Patent No.: US 9,299,388 B2
(45) Date of Patent: Mar. 29, 2016

(54) VIDEO PLAYBACK

(75) Inventors: Koichi Abe, Tokyo (JP); Shogo Tsubouchi, Tokyo (JP)

(73) Assignee: GVBB Holdings S.A.R.L., Luxembourg (LU)

( * ) Notice: Subject to any disclaimer, the term of this patent is extended or adjusted under 35 U.S.C. 154(b) by 332 days.

(21) Appl. No.: 12/733,522

(22) PCT Filed: Sep. 10, 2007

(86) PCT No.: PCT/JP2007/000982
§ 371 (c)(1),
(2), (4) Date: Mar. 5, 2010

(87) PCT Pub. No.: WO2009/034597
PCT Pub. Date: Mar. 19, 2009

(65) Prior Publication Data
US 2010/0195976 A1 Aug. 5, 2010

(51) Int. Cl.
*H04N 5/783* (2006.01)
*H04N 9/80* (2006.01)
*G11B 27/00* (2006.01)
*G11B 27/10* (2006.01)

(52) U.S. Cl.
CPC ............ *G11B 27/005* (2013.01); *G11B 27/105* (2013.01); *H04N 5/783* (2013.01)

(58) Field of Classification Search
USPC .................................. 386/278–290, 343–352
See application file for complete search history.

(56) References Cited

U.S. PATENT DOCUMENTS

| | | | |
|---|---|---|---|
| 6,760,536 B1* | 7/2004 | Amir et al. | 386/344 |
| 7,623,756 B2* | 11/2009 | Komori et al. | G11B 27/005 386/248 |
| 8,606,089 B2* | 12/2013 | Nakagawa | G11B 27/105 386/344 |
| 2002/0178453 A1* | 11/2002 | Jun et al. | 725/88 |
| 2003/0072556 A1* | 4/2003 | Okujima et al. | 386/46 |
| 2004/0179814 A1* | 9/2004 | Yoon et al. | 386/46 |
| 2004/0202447 A1* | 10/2004 | Kim | 386/46 |
| 2007/0081798 A1* | 4/2007 | Peng et al. | 386/126 |
| 2010/0275121 A1* | 10/2010 | Johnson | 715/719 |

FOREIGN PATENT DOCUMENTS

| | | |
|---|---|---|
| DE | 102004036013 | 12/2005 |
| EP | 1286351 | 2/2003 |
| EP | 1367588 | 12/2003 |
| JP | 06176550 A | 6/1994 |
| JP | 11191248 A | 7/1999 |
| JP | 2004343201 A | 12/2004 |

(Continued)

OTHER PUBLICATIONS

Hurst, et al., Advanced User Interfaces for Dynamic Video Browsing, Oct 10-16, 2004.*

(Continued)

*Primary Examiner* — Hung Dang
(74) *Attorney, Agent, or Firm* — Arent Fox LLP

(57) ABSTRACT

The present invention provides a video playback apparatus, and more particularly, an apparatus, a method and a playback program for promptly and accurately playing back a video image. The apparatus comprises a means for receiving a video playback request from a predetermined video playback position; and a means for playing back the video forwardly or backwardly from a position separated from the predetermined video playback position by a predetermined time up to the predetermined video playback position at a predetermined speed upon receiving the request for playing back the video.

11 Claims, 14 Drawing Sheets

(56) References Cited

FOREIGN PATENT DOCUMENTS

| JP | 2005293680 A | 10/2005 |
|---|---|---|
| JP | 2007013358 A | 1/2007 |
| WO | WO 01/35413 | 5/2001 |
| WO | WO 02/39450 | 5/2002 |

OTHER PUBLICATIONS

Search Report Dated May 15, 2008, PCT/JP2007/000982.
Abstract of JP 2005293680 published Oct. 20, 2005.
Abstract of JP 06176550 published Jun. 24, 1994.
Abstract of JP 11191248 published Jul. 13, 1999.
Abstract of JP 2004343201 published Dec. 2, 2004.
Reasons for Rejection in Japanese Application No. 2010-523649, mailed Jul. 10, 2012.
Notification of Reasons for Rejection dated Nov. 13, 2012 regarding Japan Patent Application No. JP2010-523649.
International Preliminary Report on Patentability dated Mar. 16, 2010 and Written Opinion dated May 15, 2008 regarding PCT Application No. PCT/JP2007/000982.

* cited by examiner

Fig. 6

| | No | In | |
|---|---|---|---|
| 611 → | 78 | 01:53:44,19 | ← 621 |
| 612 → | 79 | 01:53:47,01 | ← 622 |
| | 80 | 01:53:49,20 | |
| | 81 | 01:53:52,19 | |
| | 82 | 01:53:55,11 | |
| | 83 | 02:02:47,08 | |
| | 84 | 02:02:51,04 | |
| | 85 | 02:02:55,19 | |
| | 86 | 02:02:59,11 | |
| | 87 | 02:04:08,17 | |
| | 88 | 02:04:12,12 | |
| | 89 | 02:05:23,17 | |
| | 90 | 05:05:59,02 | |
| | 91 | 02:06:03,27 | |
| | 92 | 02:06:06,21 | |
| | 93 | 02:06:40,16 | |
| | 94 | 02:07:01,19 | |
| 613 → | 95 | 02:07:05,13 | |

Device A

600

VIDEO PLAYBACK

This application claims the benefit, under 35 U.S.C. §365 of International Application PCT/JP2007/000982, filed Sep. 10, 2007, which was published in accordance with PCT Article 21(2) on Mar. 19, 2009 in English.

TECHNICAL FIELD

The present invention relates to a video playback apparatus, and more particularly, to an apparatus and method for promptly and accurately playing back a video image from a desired position.

BACKGROUND ART

When moving images are cued up by a video playback apparatus in order to play back and edit the moving images, a target image at the head of the moving images to be played back is outputted. Here, "cue up" is, in general, intended to mean an operation to cue an image at the start of a plurality of images to be played back in preparation for the playback. In the case that, images of, for example, a sports game, news, a concert, or surveillance areas, are recorded, a plurality of images recorded at different positions tend to be similar to the target image to be cued up, and thus, an operator operating the video playback apparatus cannot ascertain that the outputted image is truly the desired image at the head of the moving images to be replayed, especially in the case of simultaneous report when the played back images are televised without modification.

In such a case, it is required to play back the cued-up video image and video images following it again in order to check if the cued-up video image is the desired image at the head of the moving images to be played back or not.

However, it takes unnecessary labor and time to play back and view the moving images using a preview function and it is difficult to detect and play back the desired image on a timely basis. Although the moving images could be played back and previewed at a speed higher than a normal speed, so as to reduce the time necessary to preview the moving images, the visibility of the images deteriorates as the playback speed become higher. A playback apparatus which can enhance the visibility of images during the high-speed playback operation and facilitate the detection of the desired image is disclosed in Japanese Patent Laid-Open Publication No. H08-70430 and the like. The playback apparatus disclosed in the above-mentioned publication is designed to cue up the desired image in such a manner that the display screen is divided into a plurality of sub-screens and a plurality of images are sequentially displayed in respective sub-screens when a plurality of images are played back at a high speed, thereby enhancing the visibility of the images.

The playback apparatus disclosed in the above-mentioned publication is adapted to display a plurality of images in a plurality of sub-screens after extracting images from once recorded images and reducing them in data size by repeatedly executing a track jump operation. Hence, a drawback is encountered in that the moving images cannot be played back (replayed) in real time while they are being recorded over a long time, as in the case of, for example, sports broadcasting, or the like. Here, the track jump operation is intended to mean an operation of moving a data reading means such as, for example, an optical head radially inwardly or outwardly by one or more tracks on a storage media such as, for example, an optical disc while the optical head is reading data stored in the optical disc. Further, the playback apparatus disclosed in the above-mentioned publication is required to read all of the recorded images once in order to search the desired image, thereby increasing the processing time. In addition, the above-mentioned playback apparatus may lose the chance of replaying images worth replaying, because images are extracted by executing the track jump operation, and accordingly, some images may not be displayed in any one of the sub-screens.

DISCLOSURE OF INVENTION

Problems to be Solved by the Invention

As will be seen from the foregoing description, the above-mentioned playback apparatus cannot cue up the desired image promptly and reliably while images are recorded over a long time.

The present invention was made in light of the circumstances as described above, and it is an object of the present invention to provide a video playback apparatus and a method which makes it easy for an operator to promptly and reliably confirm whether an image outputted as a result of the cue-up operation is the desired image or not.

Means for Solving the Problems

In order to solve the above-described problem, there is provided a video playback apparatus comprising: a means for receiving a video playback request from a predetermined video playback position; and a means for playing back said video forwardly or backwardly from a position separated from said predetermined video playback position by a predetermined time up to said predetermined video playback position at a predetermined speed upon receiving said request for playing back said video.

The present invention will be described in detail below.

The means for receiving a video playback request from a predetermined video playback position is adapted to receive a signal causing the apparatus to read a video image of a video playback position, which is designated by a marked point in advance inputted by, for example, an operator conducting an image playback operation while images are being recorded, from a storing means having recorded therein images. Here, the "marked point" is intended to mean a position along a time axis designated by a time at which the image was recorded or a frame number at which the image is located. The position of the image may be expressed as a relative position. Here, the "image" may include not only a sequential moving image such as for example, a video image, but also sound data, any one of a plurality of sequential still images, and the like. Here, the storing means may be constituted by any image recording apparatus including, for example, a server, a DVD recorder, a CD recorder, a video recorder, a hard disk recorder, and/or the like, and will normally carry out an image playback function, as well. Further, the means for playing back the video may be constituted by any playback apparatus including, for example, a server, a DVD player, a CD player, a video player, and/or the like. Needless to say, the playback apparatus may be integrated with the aforementioned recording apparatus.

The means for playing back the video forwardly or backwardly from a position separated from the predetermined video playback position by a predetermined time up to the predetermined video playback position at a predetermined speed upon receiving the request for playing back the video is operative to read images from the predetermined video playback position up to the position separated from the predetermined video playback position by a predetermined elapsed time from the storing means and play back them forwardly at a predetermined speed or read images from the predetermined video playback position up to the position separated from the predetermined video playback position by a predetermined retrospective time from the storing means and play back them backwardly at a predetermined speed after receiving the request for playing back the video. The position separated from the predetermined video playback position by the predetermined elapsed time or the position separated from the predetermined video playback position by the predetermined retrospective time, and the forward or backward playback speed used to determined the predetermined elapsed or retrospective time can be specified or changed if required by the operation. Further, the forward or backward playback is selectable as the operator wishes. Here, the forward playback may include a playback at a normal speed (1×), a playback at a slow speed such as, for example, 0.5 times normal speed (0.5×), a playback at a high speed such as, for example, three times normal speed (3×), five times normal speed (5×), or the like, and a frame-by-frame playback. The backward playback may include a backward playback at a normal speed (−1×), a backward playback at a slow speed such as, for example, −0.5 times normal speed (0.5×), a backward playback at a high speed such as, for example, three times normal speed (−3×), five times normal speed (−5×), or the like, and a frame-by-frame backward playback. The forward or backward playback speed can be specified or changed if required by the operation. The high speed forward or backward playback may be carried out by literally changing the forward or backward image playback speed or skipping images intervening between images to be played back forwardly or backwardly.

The above-mentioned predetermined speed may be constant. Alternatively the above-mentioned predetermined speed may be variable in accordance with a difference in position or time between the predetermined video playback position and a position at which the image is currently being played back forwardly or backwardly, for example, in such a manner that the predetermined speed is decreased as the time difference becomes smaller. This makes it possible for an operator to confirm that the predetermined video playback position is getting closer, thereby enhancing the visibility and operability. The forward or backward playback may be terminated at any time. Further, in the case that the cue-up operation is performed with a wrongly specified cue-up position, it is easy to adjust the cue-up position and then restart the cup-up operation.

Another aspect of the present invention provides a video playback method and a video playback program comprising one or more processing steps each corresponding to the aforementioned means.

Advantageous Effects of the Invention

The present invention makes it easy for an operator to promptly and reliably confirm whether the image outputted as a result of the cue-up operation is the desired image or not.

BRIEF DESCRIPTION OF THE DRAWINGS

FIG. 6 is a view showing examples of marked points displayed by the edited image displaying means of the image editing apparatus shown in FIG. 3.

EXPLANATION OF THE REFERENCE NUMERALS

110 Image Storing Means
120 Image Displaying Means
130 Edit Controlling Means
180 Editing computer
301 Inputting Means
311 Recording and Editing Means
312 Displaying Means
313 Displaying Means
710 Video playback apparatus
711 video playback request receiving means (means for receiving a video playback request)
712 video forward/backward playback means (means for playing back the video forwardly or backwardly)
713 video data storage unit
714 video signal processing unit
715 video signal outputting unit

DETAILED DESCRIPTION

Preferred embodiments of the present invention will be described below with reference to the accompanying drawings.

Figure 1:
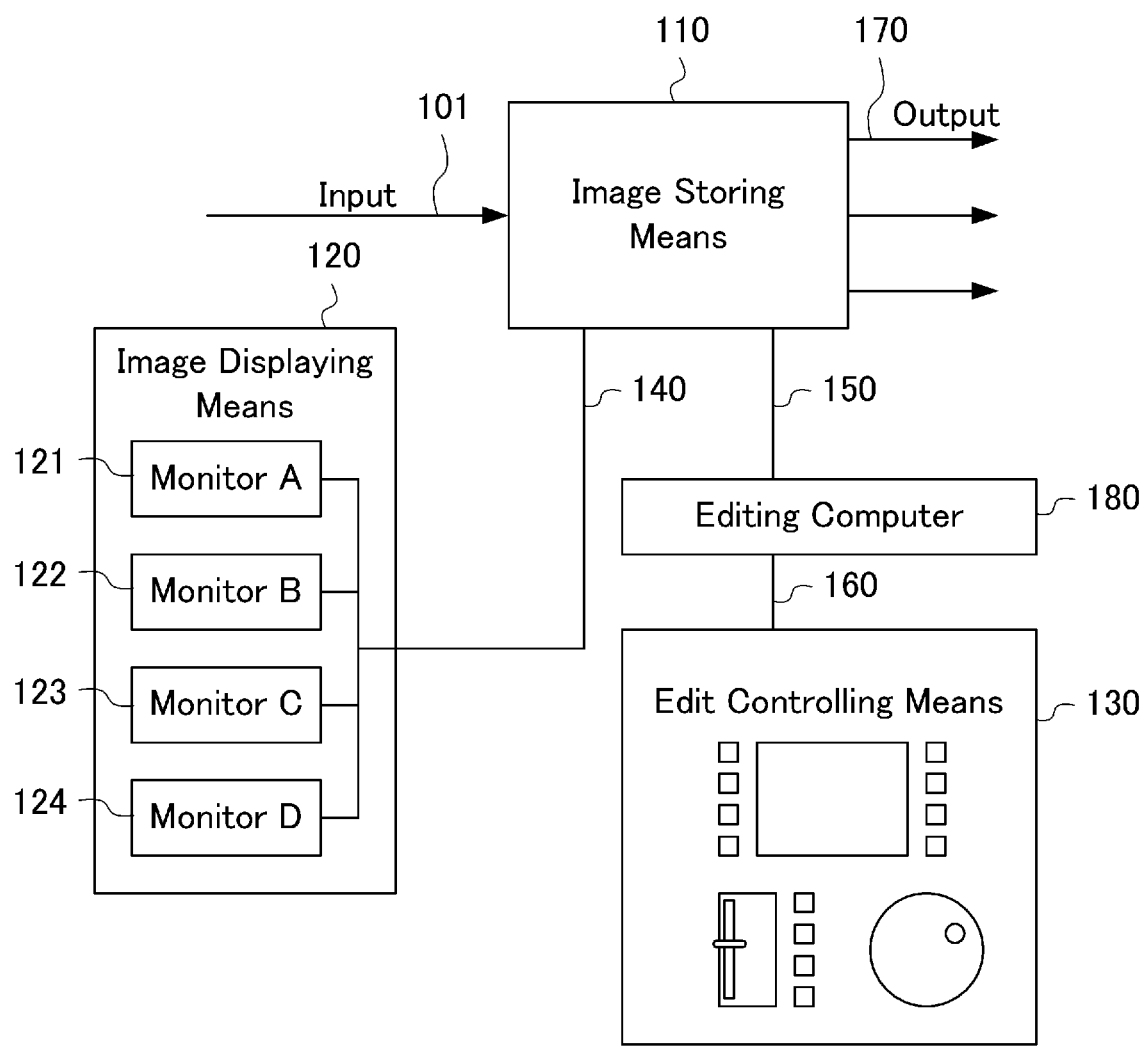
FIG. 1 is a block diagram showing an example of a video playback system to be used to explain the present invention.

FIG. 1 is a block diagram showing an example of a video playback system to be used in combination with a video playback apparatus according to the present invention. As shown in FIG. 1, the video playback system 100 comprises an image storing means 110, an edit controlling means 130, an editing computer 180, and an image displaying means 120 for storing and playing back images. The editing computer 180 incorporates the video playback apparatus according to the present invention. Here, the image storing means 110 includes an inputting means 101 having at least one line and an outputting means 170 having one or more, for example, three lines, thereby enabling the image storing means alone to provide three kinds of image. Further, in the case that a plurality of image storing means are operated in combination with one another, a plurality of input systems and a plurality of output systems become available, thereby enabling to provide multilateral images with a sense of realism especially when a multiplex broadcast such as, for example, concerts or live sport events are carried out. The editing computer 180 and the image storing means 110 can be connected with each other through a wired or wireless network 150 such as, for example, a LAN (Local Area Network), RS-422A, RS-232C, or the like. The controlling means 130 and the editing computer 180 can be connected with each other through any connecting means 160 such as, but not limited to, a RS-422A, USB (Universal Serial Bus), or the like. The image displaying means 120 and the image storing means 110 can be connected with each other through any wired or wireless image transferring means 140 such as, but not limited to, a video cable. While it is shown in the drawings that only one editing computer and only one image displaying means is connected with the single image storing means 100, a plurality of editing computers and/or a plurality of image displaying means may be connected with the image storing means 100. In addition to the previously mentioned case that a plurality of image storing means are operated simultaneously, in the case that a plurality of editing computers and a plurality of image displaying means are connected with the image storing means 100, a plurality of images can be edited and displayed.

Figure 2:
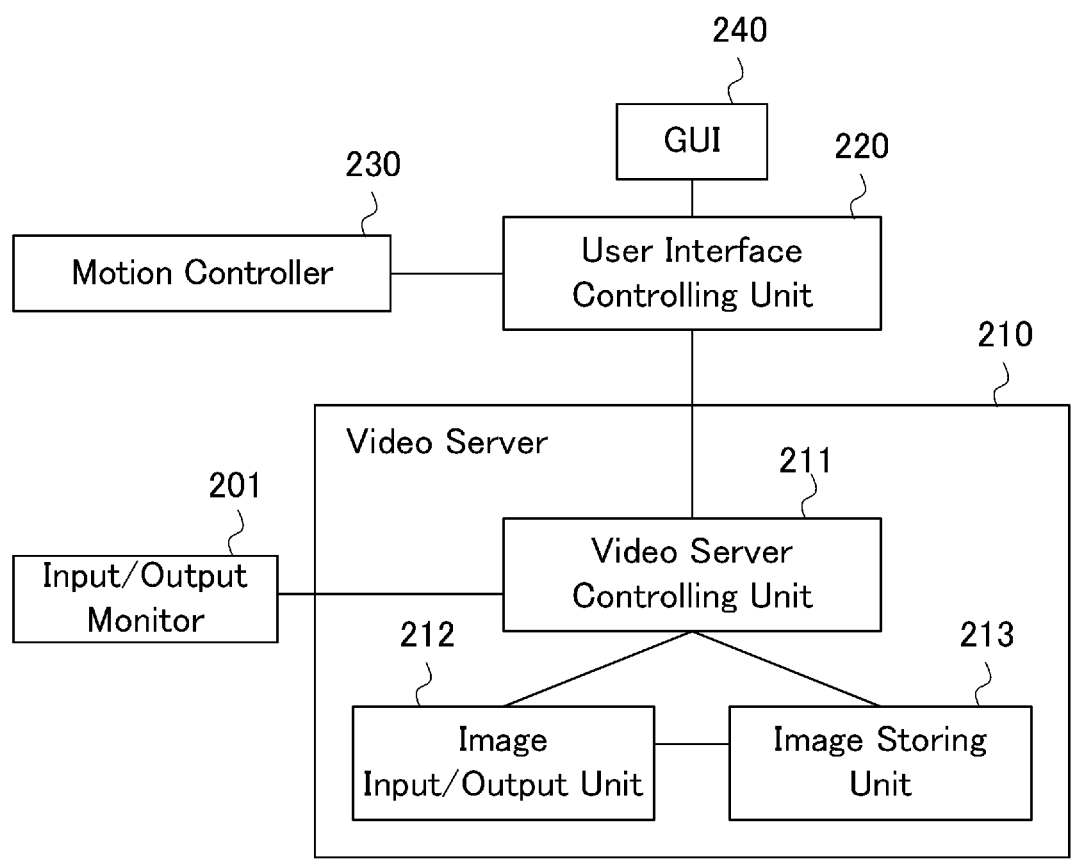
FIG. 2 is a block diagram showing another example of a video playback system to be used to explain the present invention.

FIG. 2 is a block diagram showing another example of a video playback system to be used in combination with a video playback apparatus according to the present invention.

As shown in FIG. 2, the video playback system 200 comprises a video server 210, an input/output monitor 201, a user interface controlling unit 220, a motion controller 230, and a GUI (graphical user interface) 240. The motion controller 230 incorporates the video playback apparatus according to the present invention.

The video server 210 is adapted to store and play back images, and includes a video server controlling unit 211, an image input/output unit 212, and an image storing unit 213.

The input/output monitor 201 is adapted to output images being stored or images and audio signals being edited in the video server 210 therethrough.

The user interface controlling unit 220 is adapted to control operating instructions inputted from the motion controller 230 and the GUI 240 and carry out editing operations on a computer display in combination with the video server 210.

The motion controller 230 is adapted to permit an operator to input instructions required for graphically editing images, and output the necessary images and audio signals to the user interface controlling unit 220.

The GUI (Graphical User Interface) 240 is adapted to provide the operator with various operating instructions in an easy-to-operate form such as, for example, an icon, to allow the operator to specify and output instructions to the user interface controlling unit 220.

The video server controlling unit 211 is adapted to execute the instructions supplied from the user interface controlling unit 220 in combination with the image input/output unit 212 and the image storing unit 213, and output images and audio signals to the input/output monitor 201.

The image input/output unit 212 is adapted to control images and audio signals inputted therein or outputted therethrough.

The image storing unit 213 is adapted to control images and signals to be inputted and stored therein.

Figure 3:
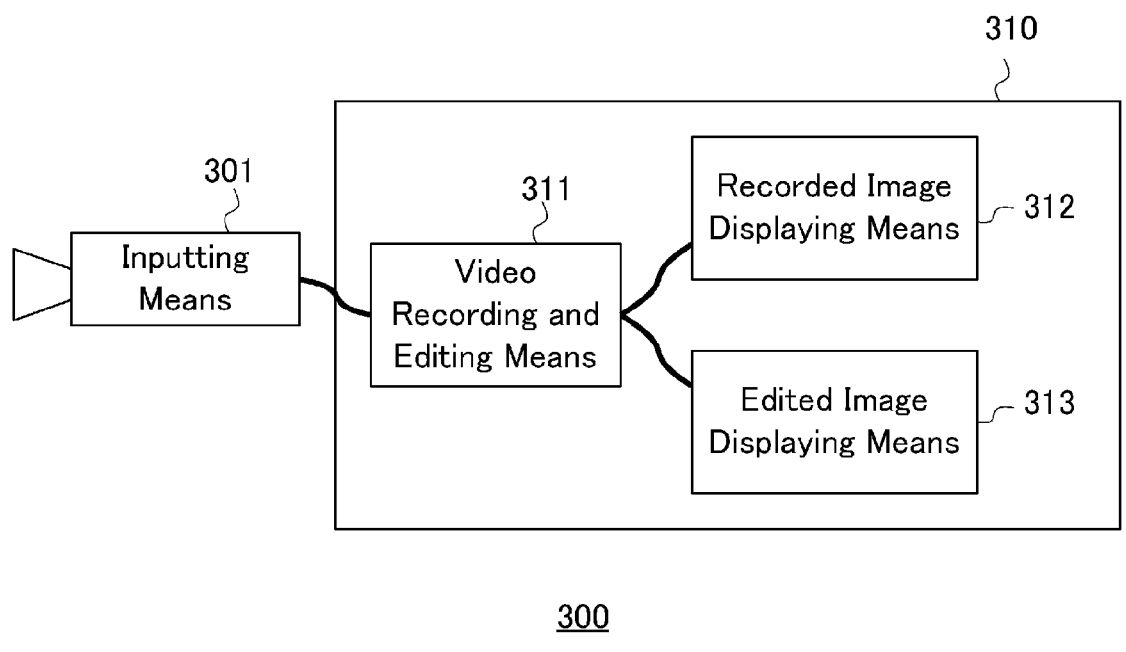
FIG. 3 is a block diagram showing an example of an image editing apparatus, to be used to explain the present invention.

FIG. 3 is a block diagram showing an example of an image editing apparatus, to be used in combination with a video playback apparatus according to the present invention. As shown in FIG. 3, the image editing apparatus 300 is a display system allowing video editing operations to be carried out on a computer display, and comprises an inputting means 301 such as, for example, a video camera, and a video playback apparatus 310 including a video recording and editing means 311, a recorded image displaying means 312, and an edited image displaying means 313. In the image editing apparatus 300, video images are edited on a screen of the recorded image displaying means 312 or the edited image displaying means 313. The video recording and editing means 311 incorporates the video playback apparatus according to the present invention.

Figure 4:
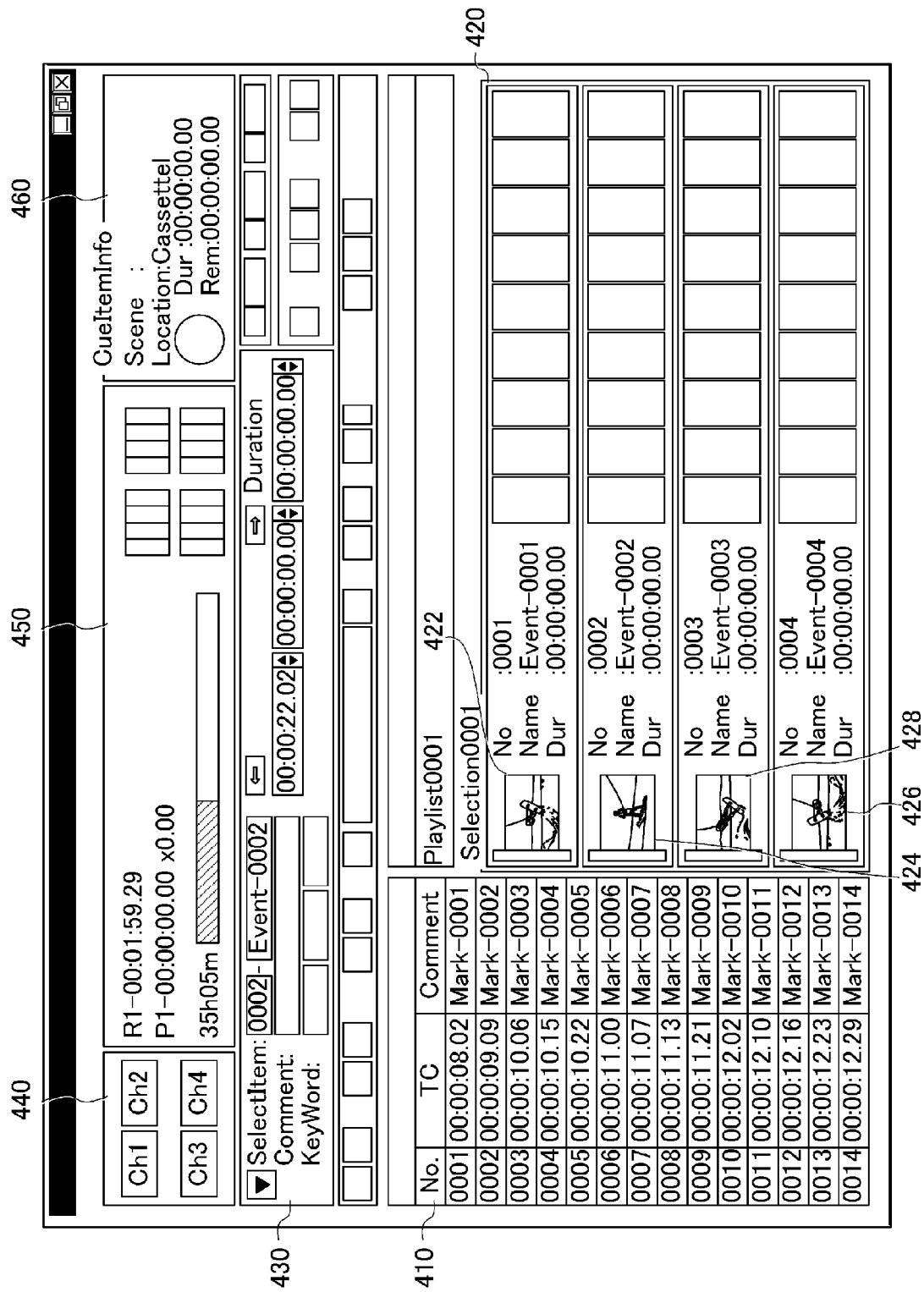
FIG. 4 is a block diagram showing an example of an editing screen displayed by an edited image displaying means of the image editing apparatus shown in FIG. 3.

FIG. 4 is a block diagram showing an example of an editing screen displayed by the edited image displaying means 313 of the image editing apparatus 300 shown in FIG. 3. Here, the editing screen serves as a GUI including a list of marked points 410, images of the marked points 420, marked point search column 430, input/output channel switching buttons 440, and the like. Instruction inputting buttons or slide bars such as, for example, a playback button, a rewind button, or the like, may be further included. The editing screen may be designed in such a manner that the above-mentioned screen items are provided in arbitrary places.

Figure 5:
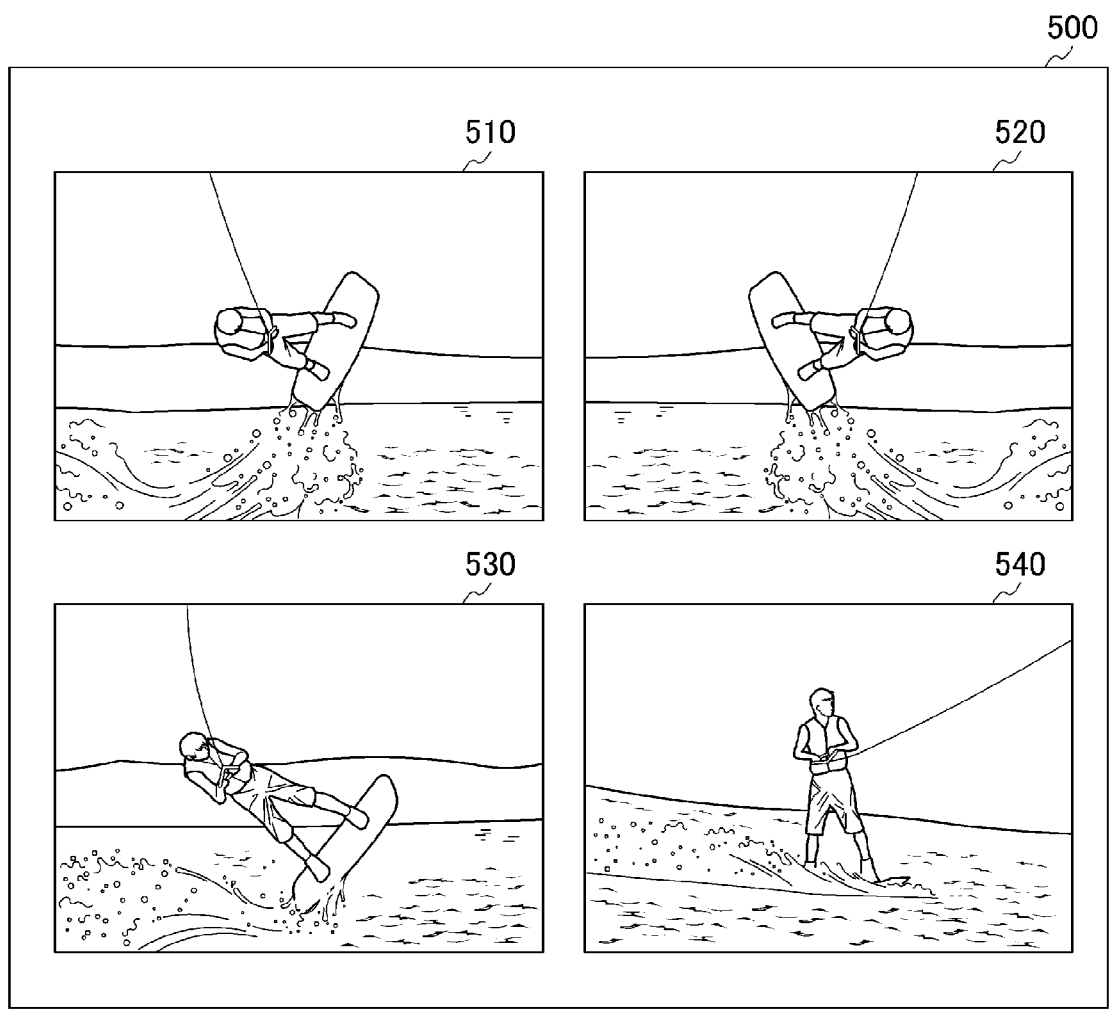
FIG. 5 is a view showing examples of screens displayed by a recorded image displaying means of the image editing apparatus shown in FIG. 3.

FIG. 5 is a view showing examples of screens displayed by the recorded image displaying means 312 of the image editing apparatus 300 shown in FIG. 3. The image displaying screen 500 may be constituted by any conventional display apparatus such as, for example, a CRT (Cathode Ray Tube) display, a liquid crystal display (LCD), a plasma display, an organic electroluminescence (EL) display, or the like. Further, images which are being edited may be outputted to a plurality of image displaying means, or a single image displaying means. The number and kinds of the image displaying means to be connected are selectable depending upon various conditions required to operate the video playback apparatus according to the present invention, such as, for example, the installation site, transportation means, mobility, or the like. In the case that only one image displaying means is used, the display screen may be displayed as being divided into a plurality of sub-screens so that a plurality of images are simultaneously displayed in the respective sub-screens or the display screen may be displayed as one single screen. In the case shown in FIG. 5, the display screen displayed by one image display means is divided into a plurality of sub-screens, i.e., an image 510 taken by a camera 1, an image 520 taken by a camera 2, and an image 540 to be rewound and played back, as well as an image 530 currently being broadcast, are shown in the sub-screens. Here, it is to be noted that each of the sub-screens thus divided can be specified at any position by the operator.

FIG. 6 is a view showing examples of marked points displayed by the edited image displaying means 313 of the image editing apparatus 300 shown in FIG. 3. The marked points are assigned automatically or manually on a timely basis while images are recorded, and distinct from one another in number 610 or time 620, each of which is required to be a sequential number. The marked points can be assigned to 25, 30, or 60 frame images in a second; however, it is to be appreciated that the present invention is not limited to the preceding number of frame images. In operation, the marked points are assigned to from several frame images to tens of frame images in a minute, or several tens of frame images to several hundreds of frame images in an hour. In FIG. 6, examples of the marked points are designated by reference numbers 611, 612 and 613.

Figure 7:
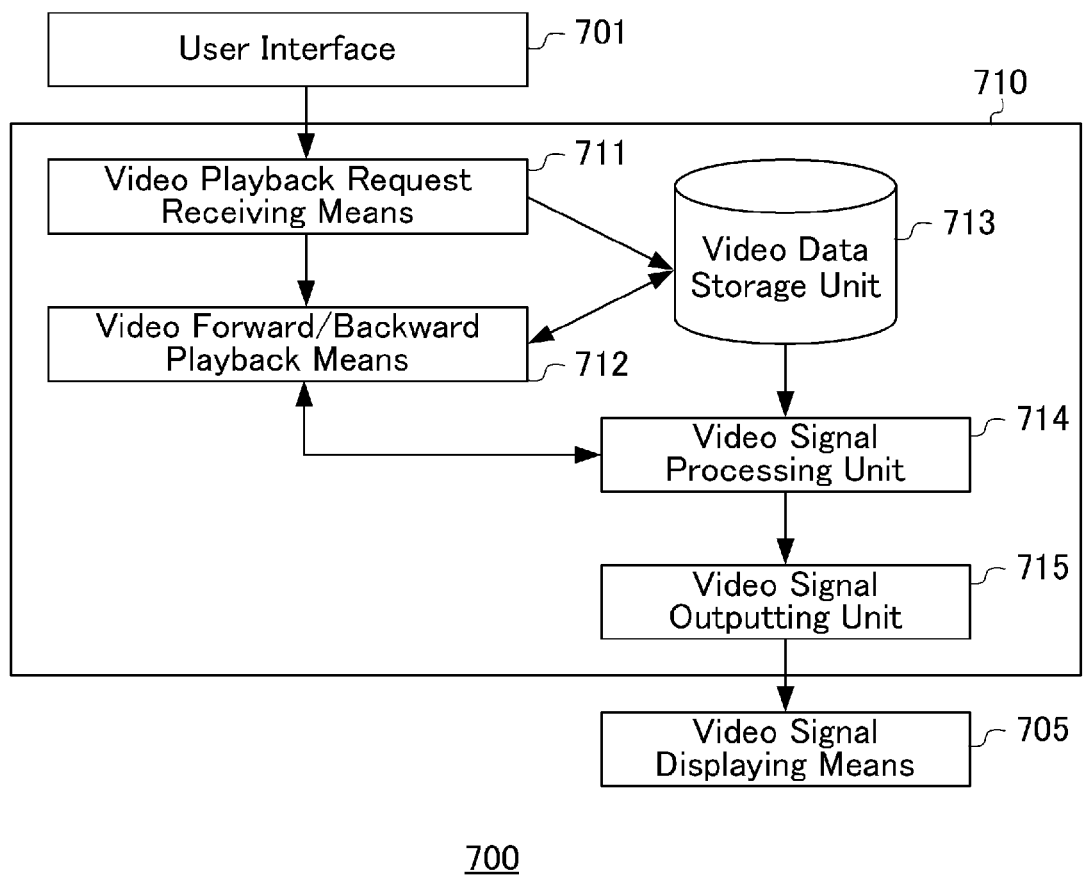
FIG. 7 is a block diagram showing one embodiment of the video playback apparatus according to the present invention.

FIG. 7 is a block diagram showing one preferred embodiment of the video playback apparatus 700 according to the present invention. When an operator selects a marked point and inputs a playback instruction, a user interface 701 transfers a video playback request to a video playback request receiving means 711. The video playback request receiving means 711 corresponds to a means for receiving a video playback request. Then, the video playback request receiving means 711 is operated to cause a video data storage unit 713 constituting a server to output an image of the marked points to the video signal processing unit 714 and to supply a video forward/backward playback instruction to a video forward/backward playback means 712. In response to the video forward/backward playback instruction, the video forward/backward playback means 712 is operated to calculate a position separated by a predetermined time from the marked point, and cause the video data storage unit 713 to output a video signal of images from the position separated by a predetermined time up to the marked point, to the video signal processing unit 714. The video signal processing unit 714 is operated to process the video signal. The image signal processed by the video signal processing unit 714 is transferred through the video signal outputting unit 715 to a video signal displaying means 705 to play back a picture from an image at the position separated by a predetermined time up to the marked point. The video forward/backward playback means 712 may detect a difference between said predetermined video playback position and a forward or backward video playback position at which the image is currently being played back forwardly or backwardly, and change the playback speed as the difference is decreased. The video forward/backward playback means 712 corresponds to a means for playing back the video forwardly or backwardly.

Figure 8:
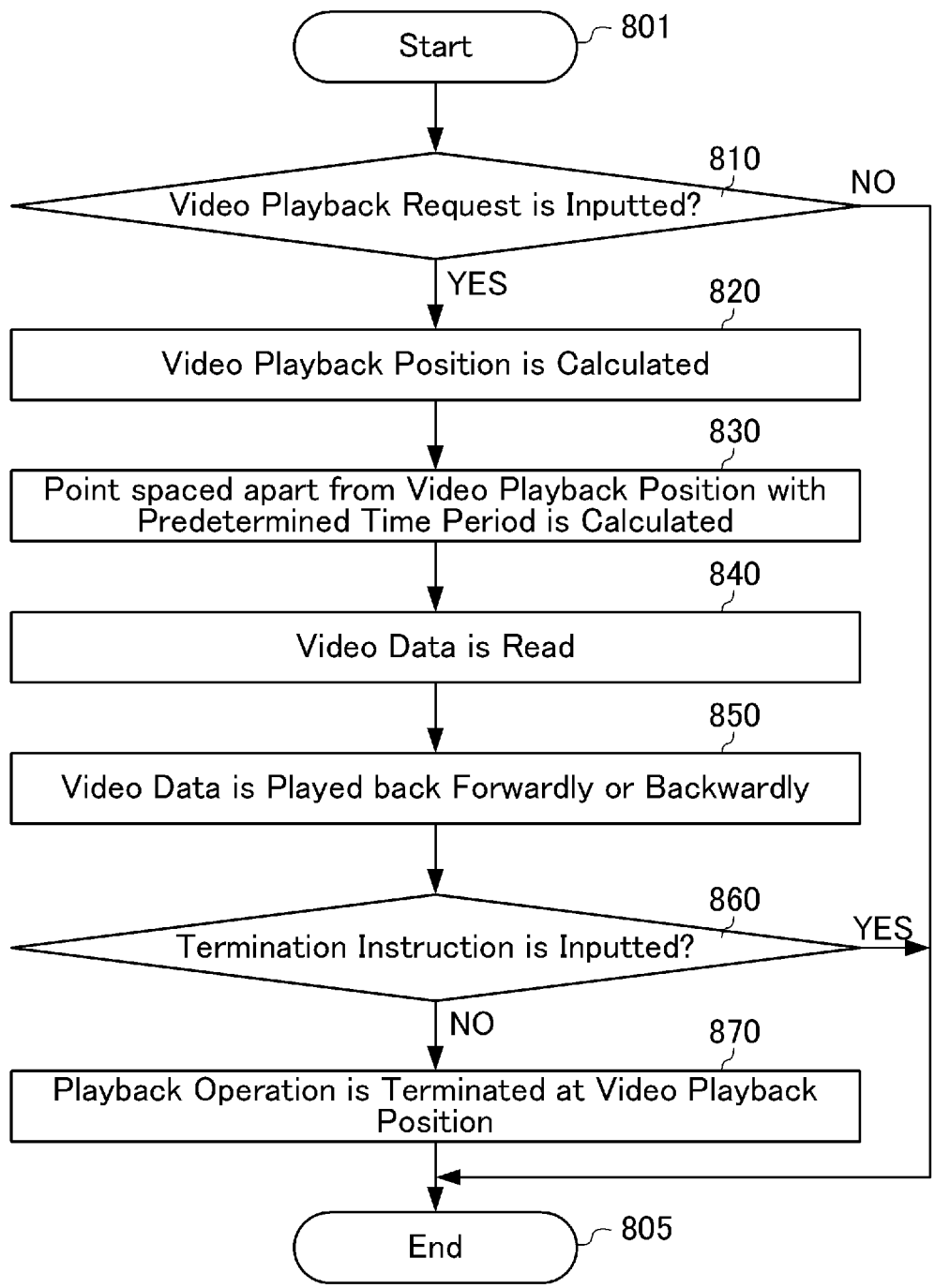
FIG. 8 is a flow chart explaining one embodiment of a video playback method carried out by the video playback apparatus shown in FIG. 7.

FIG. 8 is a flow chart explaining one embodiment of a video playback method carried out by the video playback apparatus shown in FIG. 7. In step 810, the video playback request receiving means 711 is operated to judge whether the video playback request is inputted or not. When it is judged that the video playback request is inputted, step 810 goes forward to step 820. When, on the other hand, it is judged that the video playback request is not inputted, the step 810 goes to END 805.

In step 820, in response to the inputted video playback request, the video forward/backward playback means 712 is operated to calculate a video playback position, in order to determine images to be played back along a time axis, and extract data of an image at a position in the vicinity of, but backward from the requested time point. Step 820 goes forward to step 830.

In step 830, the video forward/backward playback means 712 is operated to calculate a point separated from the video playback position by a predetermined time. Step 830 goes forward to step 840.

In step 840, the video signal processing unit 714 is operated to read video data from the video playback position to the point separated by the predetermined time is read from the video data storage unit 713. Step 840 goes forward to step 850.

In step 850, the video signal processing unit 714 is operated to play back the video data forwardly or backwardly to be outputted to the video signal displaying means 705 through the video signal outputting unit 715. The forward or backward playback speed may be set at any desired value, and the forward or backward high speed playback may be carried out by changing the playback speed or skipping images intervening between images to be played back. Step 850 goes forward to step S860.

In step 860, the video playback request receiving means 711 is operated to judge whether a termination instruction is inputted by the operator or not. When it is judged that the termination instruction is not inputted, it is further judged that the images played back forwardly or backwardly in step 850 are images desired by the operator. Step 860 goes forward to step 870. When, on the other hand, it is judged that the termination instruction is inputted, it is judged that the images played back forwardly or backward are not images desired by the operator. Step 860 goes to END 805.

In step 870, the video forward/backward playback means 712 is operated to terminate the playback operation at the video playback position after the images have been played back forwardly or backwardly.

Figure 9:
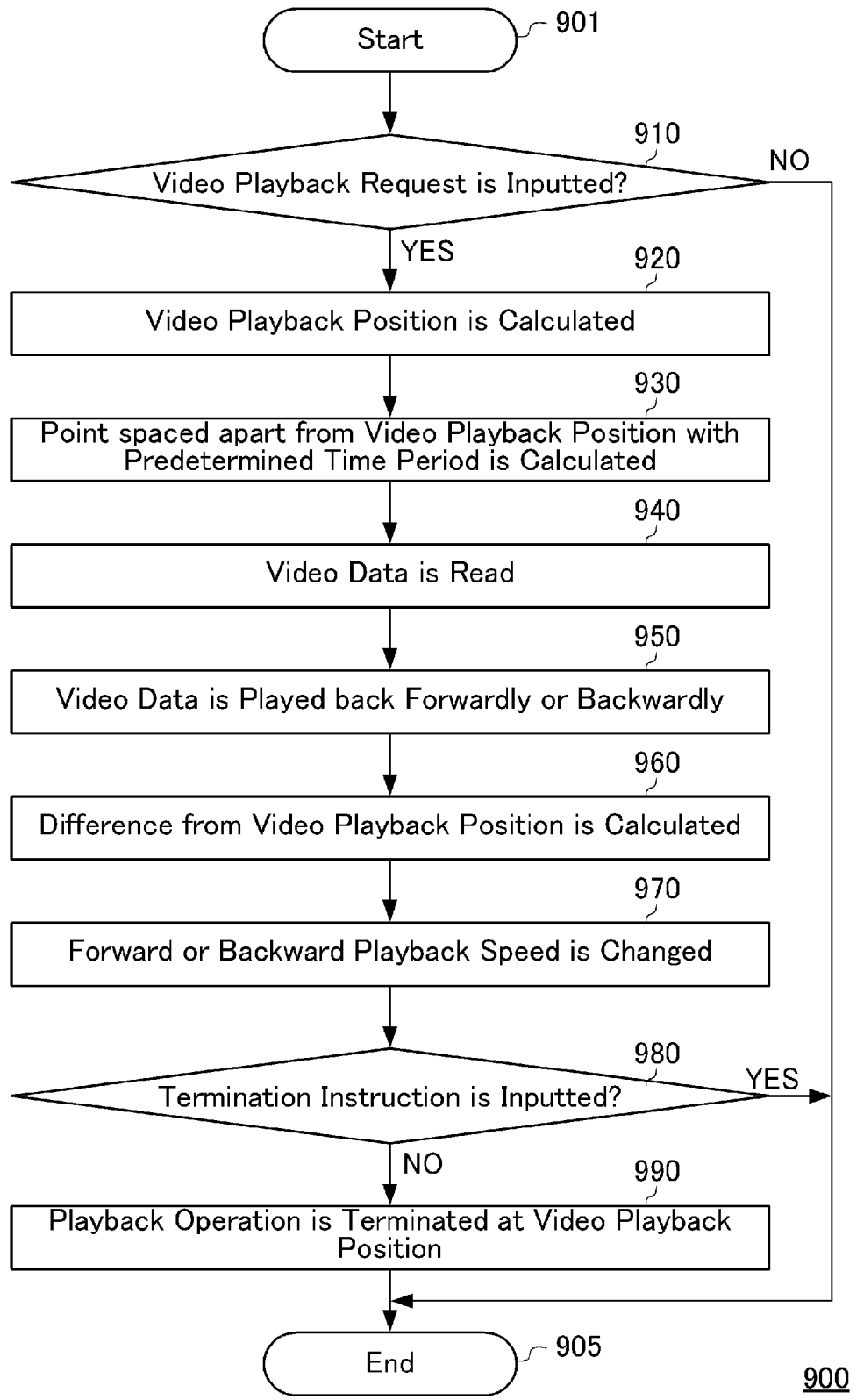
FIG. 9 is a flow chart explaining another embodiment of a video playback method carried out by the video playback apparatus shown in FIG. 7.

FIG. 9 is a flow chart explaining another embodiment of a video playback method carried out by the video playback apparatus 700. In step 910, the video playback request receiving means 711 is operated to judge whether the video playback request is inputted or not. When it is judged that the video playback request is inputted, step 910 goes forward to step 920. When, on the other hand, it is judged that the video playback request is not inputted, the step 910 goes to END 905.

In step 920, in response to the inputted video playback request, the video forward/backward playback means 712 is operated to calculate a video playback position, in order to determine images to be played back along a time axis, and extract data of an image at a position in the vicinity of, but backward from the requested time point. Step 920 goes forward to step 930.

In step 930, the video forward/backward playback means 712 is operated to calculate a point separated from the video playback position by a predetermined time. Step 930 goes forward to step 940.

In step 940, the video signal processing unit 714 is operated to read video data from video playback position to the point separated by the predetermined time from the video data storage unit 713. Step 940 goes forward to step 950.

In step 950, the video signal processing unit 714 is operated to play back the video data forwardly or backwardly to be outputted to the video signal displaying means 705 through the video signal outputting unit 715. The forward or backward playback speed may be set at any desired value, and the forward or backward high speed playback may be carried out by changing the playback speed or skipping images intervening between images to be played back. Step 950 goes forward to step 960.

In step 960, the video forward/backward playback means 712 is operated to calculate the difference between the video playback position and the point of the image currently being played back forwardly or backwardly along the time axis is detected. Step 960 goes forward to step 970.

In step 970, the video forward/backward playback means 712 is operated to change the forwardly or backwardly playback speed as the difference detected in the previous step 960 get smaller. Step 970 goes forward to step 980.

In step 980, the video playback request receiving means 711 is operated to judge whether a termination instruction is inputted by the operator or not. When it is judged that the termination instruction is not inputted, it is further judged that the images played back forwardly or backwardly in step 950 are images desired by the operator. Step 980 goes forward to step 990. When, on the other hand, it is judged that the termination instruction is inputted, it is judged that the images played back forwardly or backwardly are not images desired by the operator. Step 980 goes to END 905.

In step 990, the video forward/backward playback means 712 is operated to terminate the playback operation at the video playback position after the images have been played back forwardly or backwardly.

Figure 10:
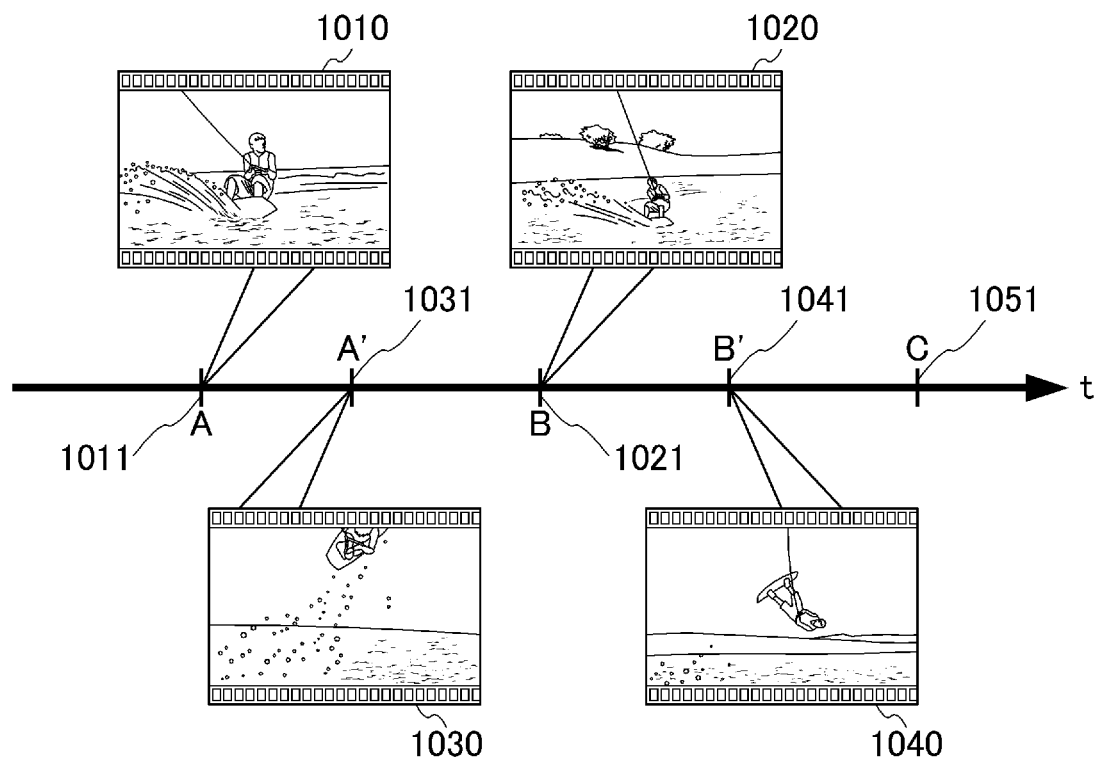
FIG. 10 is a schematic view explaining a principle of one embodiment of a video playback method according to the present invention.

FIG. 10 is a schematic view explaining the principle of an embodiment of the video playback apparatus according to the present invention. Marked points are assigned to images of position A (1011) and position B (1021) separated from the position A by a predetermined elapsed time, both of which are recorded prior to an image of current point C (1051). The image (1010) of the position A and the image (1029) of the position B are similar to each other. However, an image (1030) of position A' (1031) following the position A is extends outside of the screen while, on the other hand, an image (1040) of position B' (1041) following the position B is fit in the screen. Here, if the position A is to be cued up, images are played back backwardly from the position A' separated from position A by a predetermined elapsed time up to the position A. Similarly, if the position B is to be cued up, images are played back backwardly from the position B' separated from position B by a predetermined elapsed time up to the position B. Thus, the images can be played back redundantly to ensure that the desired image B is cued up.

Figure 11:
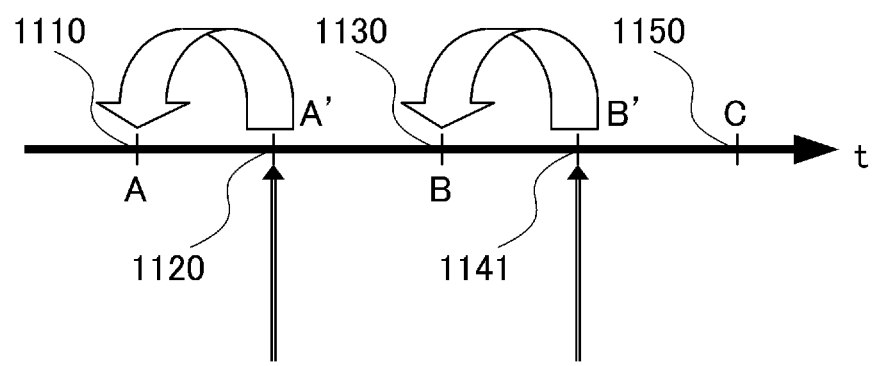
FIG. 11 is a view showing the concept of FIG. 10.

FIG. 11 is a view explaining the concept described with referenced to FIG. 10. It is shown that the images are played back from the position A' (1120) and the position B' (1140) respectively separated from the marked points A (1110) and B (1130) by predetermined elapsed times toward the respective marked points. Such an embodiment makes it possible for an operator to assign a marked point to an image of a particular event and later play back images result-related to the event, and is thereby effective in sport broadcasting.

Figure 12:
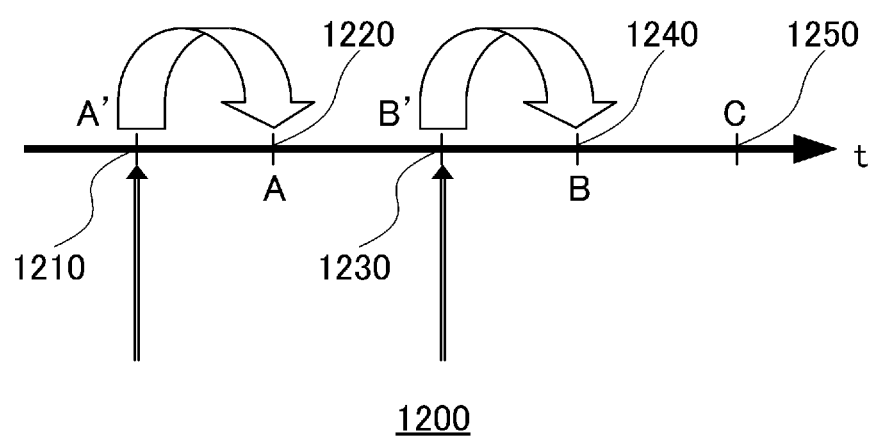
FIG. 12 is a view the opposite concept of FIG. 11.

FIG. 12 is a view explaining a concept opposite to that of FIG. 11. It is shown that the images are played back from the position A' (1210) and the position B' (1230) respectively separated from the marked points A (1220) and B (1240) by predetermined retrospective times toward the respective marked points. Such an embodiment makes it possible for an operator to assign a marked point to an image of a particular event and later play back images causally-related to the event, thereby effective in, for example, live news broadcasting and surveillance activity.

Example 1

Figure 13:
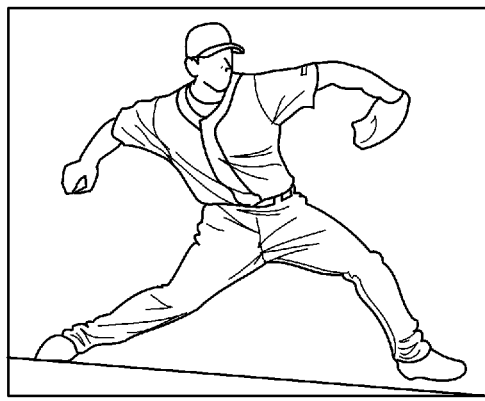
FIG. 13 is a view showing examples of screens displayed by one embodiment.
Figure 13:
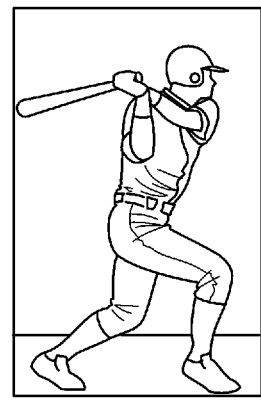
Figure 13:
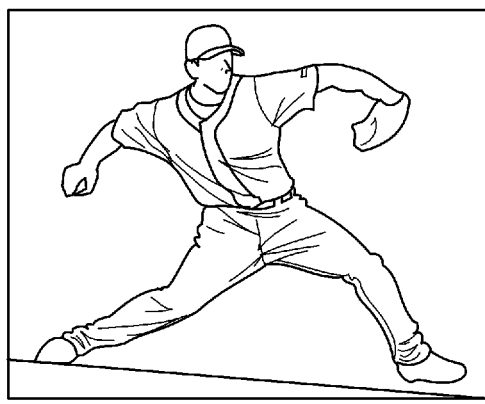
Figure 13:
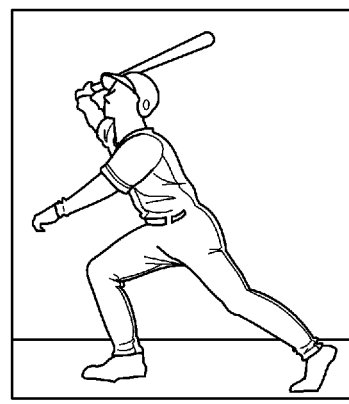
Figure 13:
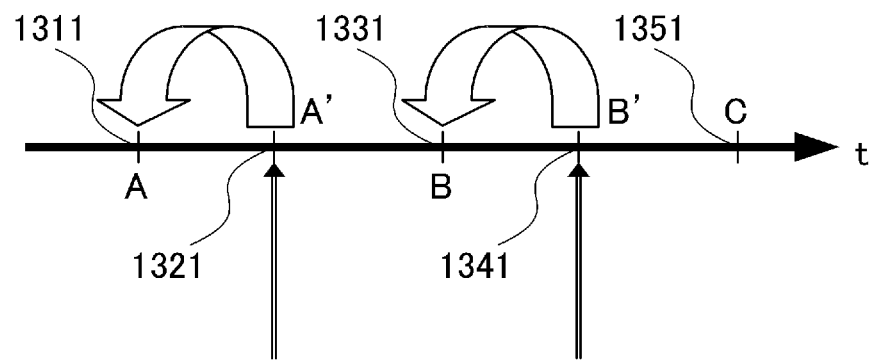

FIG. 13 is a view showing examples of screens displayed by one embodiment in the case that the present invention is applied to baseball broadcasting. Pitching images (1310) and (1330), to which marked point A (1311) and marked point B (1331) are respectively assigned along the time axis, but the images cannot be distinguished from each other easily. However, a batter made a hit (1320) at an event A' (1321) following the pitching image (1310) while, on the other hand, a batter struck out (1340) at an event B' (1341) following the pitching image (1330). From the foregoing description it is to be understood that the video playback apparatus according to the present invention enables images from the position A' up to the position A to be played back backwards if a marked point is assigned to an image of position A, and images from position B' up to the position B to be played back backwards if a marked point is assigned to an image of position B, to ensure that pitching images of the scenes where the batter hits and the pitching images where the batter strikes out are selectively and promptly cued up at an operator's request.

Example 2

Figure 14:
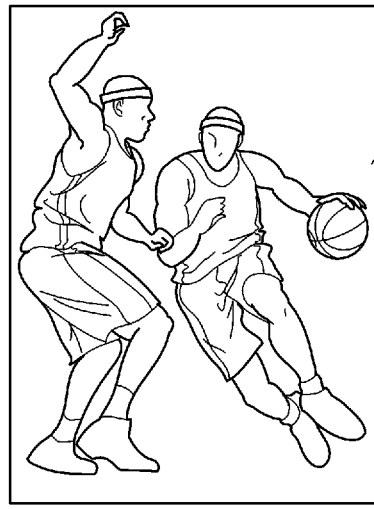
FIG. 14 is a view showing examples of screens displayed by another embodiment.
Figure 14:
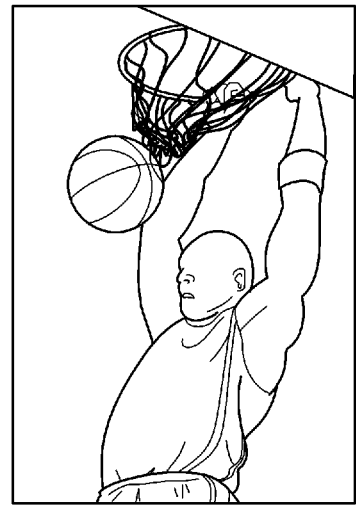
Figure 14:
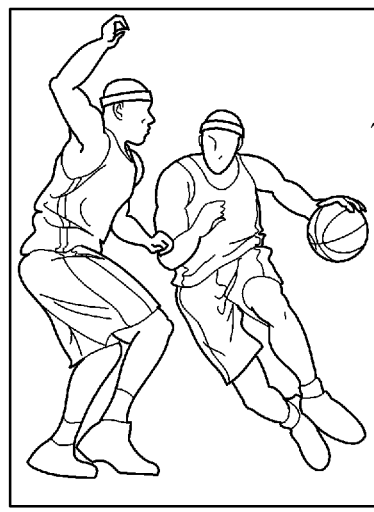
Figure 14:
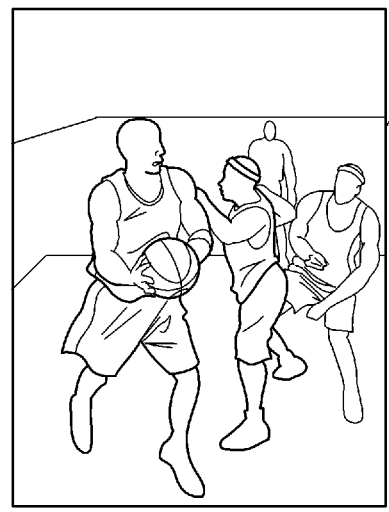
Figure 14:
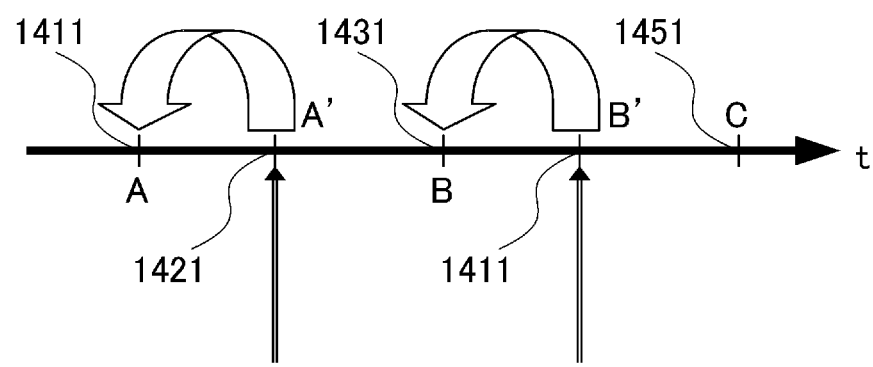

FIG. 14 is a view showing examples of screens displayed by another embodiment in the case that the present invention is applied to broadcasting of a fast-moving sport such as, for example, basketball. Dribbling images (1410) and (1430), to which marked point A (1411) and marked point B (1431) are respectively assigned along the time axis, cannot be distinguished from each other easily. However, a basketball was shot (1420) at an event A' (1421) following the dribbling image (1410) while, on the other hand, players were scrambling for the ball (1440) at an event B' (1441) following the dribbling image (1430). Similar to the case of Example 1, images from the position A' up to the position A can be played back backwards if a marked point is assigned to an image of position A, and images from position B' up to the position B can be played back backwardly if a marked point is assigned to an image of position B. Further, in the present embodiment, while images from a backward playback start position (A' or B') up to a marked point (A or B) are played back backwards, the backwards playback speed at which the images are played back backwards is decreased as the images approach the marked point (A or B), thereby making it possible for an operator to confirm that the images are approaching to the marked point, as well as ensuring that the fast-moving images are reliably recognized.

Example 3

Figure 15:
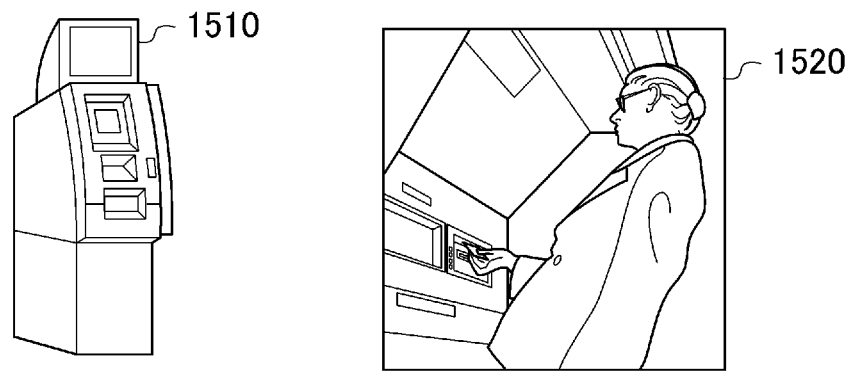
FIG. 15 is a view showing examples of screens displayed by yet another embodiment.
Figure 15:
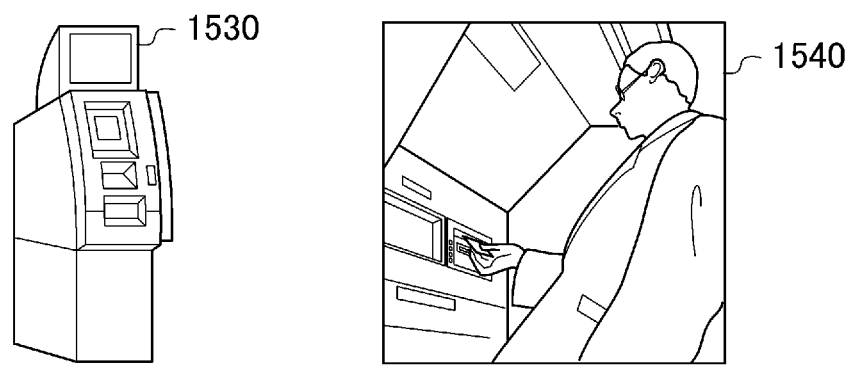
Figure 15:
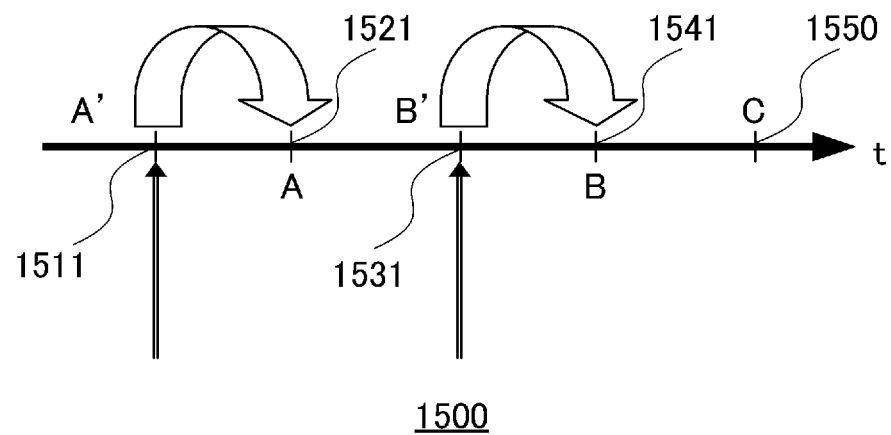

FIG. 15 is a view showing examples of screens displayed by yet another embodiment in the case that the present invention is applied to a surveillance activity of, for example, a factory, a shop, public facilities, or the like. In order to record images of and thus continuously monitor facilities, in which ATMs (Automated Teller Machines) (1510, 1530) are installed, a marked point is assigned to an image (1520) of point A (1521) or an image (1540) of point B (1541) along a time axis after ATM business hours or when an abnormal condition such as, for example, the occurrence of crime or ATM failure is detected by, for example, a sensor. It is appreciated that when an operator requests to play back an image of the position of the marked point B, so as to confirm the abnormal condition, images from a backward playback start position B' up to the marked point B are played back forwardly, thereby enabling an operator to know how the abnormal condition occurred, how a user looked like or behaved, and the like. Here, the abnormal condition may include, for example, entry into facilities after business hours or closing hour, control of entry into and departure from a maintenance area, detection of products deviated from the specification, fire, or failure of manufacturing equipment, as well as the occurrence of a crime or a malfunction in the ATM facilities. The marked point may be assigned automatically when a predetermined requirement as described in the above is not met, or by, for example, a security guard checking visually. If a marked point is not assigned by the security guard checking visually, the marked point is assigned to an image currently being displayed automatically when it is determined that a predetermined requirement is not met by a sensor, such as, for example, an occupancy sensor, a temperature sensor, a flow sensor, a constituent concentration sensor, a weight sensor, a form recognition sensor, or the like. When an operator is required to confirm how a situation shown by the image of the marked point came about, images from a point separated from the marked point by a retrospective predetermined time up to the marked point can be played back forwardly. It is appreciated that if a plurality of marked points are assigned to a plurality of images, cause-and-effect relationships concerning events shown respectively by the images of the marked points can be promptly grasped.

Although a plurality of embodiments of the present invention have been described in the above, the present invention is not limited to those embodiments. Further, it should be understood that effects described in the embodiments of the present invention are for illustrative purposes only, and the effects of the present invention are not limited to those described in the embodiments.

The invention claimed is:

1. A video playback apparatus for video data having a plurality of marked points, comprising:
   means for receiving a video playback request for the video data from a predetermined video playback position, wherein the predetermined video playback position is indicated by one of the plurality of marked points identified by a unique reference indicator;
   means for automatically calculating a second position in response to receiving the video playback request, the second position being separated from said predetermined video playback position by a predetermined time in response to the receipt of the video playback request; and
   means for playing back said video forwardly or backwardly from the second position up to said predetermined video playback position at a predetermined speed if said request for playing back said video data is received and to terminate playback of said video at the predetermined video playback position, wherein the playback from the second position to the predetermined video playback position enables a user to distinguish the predetermined video playback position from another of the plurality of marked points,
   wherein said forward or backward playback carried out at said predetermined speed is a forward or backward high speed playback carried out at a variable image playback speed, the variable image playback speed being automatically varied.

2. The video playback apparatus according to claim 1, wherein the variable image playback speed is based on a relationship between the predetermined video playback position and a position at which the image is currently being played back.

3. The video playback apparatus according to claim 1, wherein said forward or backward playback is carried out at said predetermined speed by skipping images intervening between images to be played back.

4. The video playback apparatus according to claim 1, wherein when said position separated by said predetermined time is a position to be reached backwardly from said predetermined video playback position, the means for playing back said video data are adapted to play back said video data forwardly up to said predetermined video playback position at said predetermined speed.

5. The video playback apparatus according to claim 1, wherein when said position separated by said predetermined time is a position to be reached forwardly from said predetermined video playback position, the means for playing back said video data are adapted to play back said video data backwardly up to said predetermined video playback position at said predetermined speed.

6. The video playback apparatus according to claim 1, further comprising:
   means for reading video data from the predetermined video playback position to the second position from a video storage unit, wherein the video data is read before said playing back said video data forwardly or backwardly from the second position up to said predetermined video playback position on a video signal displaying means.

7. A video playback apparatus for video data having a plurality of marked points, comprising:
   means for receiving a video playback request for the video data from a predetermined video playback position, wherein the predetermined video playback position is indicated by one of the plurality of marked points identified by a unique reference indicator;
   means for automatically calculating a second position in response to receiving the video playback request, the second position being separated from said predetermined video playback position by a predetermined time in response to the receipt of the video playback request; and
   means for playing back said video forwardly or backwardly from the second position up to said predetermined video playback position at a predetermined speed if said request for playing back said video data is received and to terminate playback of said video at the predetermined video playback position, wherein the playback from the second position to the predetermined video playback position enables a user to distinguish the predetermined video playback position from another of the plurality of marked points,
   wherein, said forward or backward playback carried out at said predetermined speed is a forward or backward high speed playback carried out by skipping images intervening between images to be played back.

8. The video playback apparatus according to claim 7, wherein said position separated by said predetermined time is a position to be reached backwardly from said predetermined video playback position when said predetermined time has elapsed, and which is adapted to play back said video data forwardly up to said predetermined video playback position at said predetermined speed.

9. The video playback apparatus according to claim 7, wherein when said position separated by said predetermined time is a position to be reached forwardly from said predetermined video playback position, the means for playing back said video data are adapted to play back said video backwardly up to said predetermined video playback position at said predetermined speed.

10. A video playback apparatus for video data having a plurality of marked points, comprising:
    means for receiving a video playback request for the video data from a predetermined video playback position, wherein the predetermined video playback position is indicated by one of the plurality of marked points identified by a unique reference indicator;
    means for automatically calculating a second position in response to receiving the video playback request, the second position being separated from said predetermined video playback position by a predetermined time in response to the receipt of the video playback request; and
    means for playing back said video forwardly or backwardly from the second position up to said predetermined video playback position at a predetermined speed if said request for playing back said video data is received and to terminate playback of said video at the predetermined video playback position, wherein the playback from the second position to the predetermined video playback position enables a user to distinguish the predetermined video playback position from another of the plurality of marked points,
    wherein said predetermined speed is changeable in accordance with a difference between said predetermined video playback position and a forward or backward video playback position at which the video is currently being played back forwardly or backwardly.

11. A video playback apparatus for video data having a plurality of marked points, comprising:

means for receiving a video playback request for the video data from a predetermined video playback position, wherein the predetermined video playback position is indicated by one of the plurality of marked points identified by a unique reference indicator;

means for automatically calculating a second position in response to receiving the video playback request, the second position being separated from said predetermined video playback position by a predetermined time in response to the receipt of the video playback request; and means for playing back said video forwardly or backwardly from the second position up to said predetermined video playback position at a predetermined speed if said request for playing back said video data is received and to terminate playback of said video at the predetermined video playback position, wherein the playback from the second position to the predetermined video playback position enables a user to distinguish the predetermined video playback position from another of the plurality of marked points, wherein said predetermined speed is decreased as a difference between said predetermined video playback position and a forward or backward video playback position at which the video is currently being played back forwardly or backwardly becomes smaller.

\* \* \* \* \*